May 31, 1932. R. H. LANGLEY 1,860,678

INDICATING DEVICE FOR RADIO SETS

Filed March 7, 1931 2 Sheets-Sheet 1

INVENTOR.
Ralph H. Langley
BY Allen & Allen
ATTORNEYS

May 31, 1932.  R. H. LANGLEY  1,860,678
INDICATING DEVICE FOR RADIO SETS
Filed March 7, 1931  2 Sheets-Sheet 2

INVENTOR.
Ralph H. Langley
BY
Allen & Allen
ATTORNEYS

Patented May 31, 1932

1,860,678

UNITED STATES PATENT OFFICE

RALPH H. LANGLEY, OF CINCINNATI, OHIO, ASSIGNOR TO THE CROSLEY RADIO CORPORATION, OF CINCINNATI, OHIO, A CORPORATION OF OHIO

INDICATING DEVICE FOR RADIO SETS

Application filed March 7, 1931. Serial No. 520,992.

My invention relates to the provision of adequate indicating devices which function in connection with operating parts, such as the condenser gang shaft of a radio set, to give a visual indication of the tuning of the several circuits or the setting of the apparatus; and my invention is applicable not only to devices which merely indicate a setting of the apparatus otherwise arranged, but also to devices which combine indicating means and means operative to vary the setting of the apparatus.

The primary object of my invention is the provision of improved controlling and/or indicating means which are more economical than those hitherto manufactured, and which have the particular advantages which will be developed hereinafter.

When the dial opening on a radio set is approximately at eye level, it is usually satisfactory to have the indicator itself in a vertical position. The trend in radio sets today, however, is toward smaller size, and in use they are generally placed in such a position that the level of the eye is well above the level of the indicator. A vertical indicator thus becomes much less desirable, since it is harder to read from an elevated position. It is, therefore, advantageous to have the indicator itself in a slanting position, say, in a position tilted back 45 degrees from the vertical, in order that it may be more easily viewed from a plurality of positions. There is a certain attractive effect in a sight or indicator opening which is recessed and extends backwardly from the front panel of the set, and such a sight opening combined with an indicator, gives excellent visibility over a very wide angle. It is an object of my invention to provide an indicating device which will have this advantage.

Again, a slanting dial while equally advantageous for indirect lighting, is more advantageous for direct lighting and may be more adequately illuminated, and it is my object to provide an indicating device which is more readily illuminated, either directly or indirectly.

Yet, again, since indirect illumination requires the placing of a light behind a translucent indicator, and since this requires a clearance in the various parts, it is still a further object of my invention to provide a type of indicator in which a light may readily be located behind a translucent scaled device without the sacrifice of over-all dimensions in the set.

With the increasing demand for a very compact radio set, it has become increasingly difficult to lay out the chassis in such a way that the gang condenser and therefore the main tuning knob and indicator, are located at the center of the chassis. In the so-called mantel designs and other very compact types, it is advantageous to place the loud speaker directly above the center of the chassis, and if the gang condenser and the indicator and tuning knobs are at the center, the loud speaker will necessarily have to be very much higher, and the cabinet correspondingly larger than otherwise.

An object of my invention is to provide an arrangement in which the gang condenser may be placed at either side of the chassis, thus giving ample room at the center for the loud speaker to be placed low in the cabinet and immediately above the chassis pan, while the visible part of the indicator may be placed substantially where desired. Thus in a preferred embodiment of my invention it is my object to provide means whereby the gang condenser shaft and other manual controls of the set may be symmetrically arranged toward the sides of the cabinet, and the indicator nevertheless placed at the center of the cabinet, so that it is not necessary to sacrifice the symmetry of the cabinet to secure a compact arrangement of the parts therein.

These and other objects of my invention which will be set forth hereinafter or will be apparent to one skilled in the art upon reading these specifications, I accomplish by that certain construction and arrangement of parts of which I shall now describe preferred embodiments, both of the type in which the controlled shaft is directly manipulated and an indicator is provided to show the setting thereof, and of a type in which the indicator is an integral part of the operating mechanism whereby the setting of the shaft is controlled. Reference is made to the drawings which form a part hereof, and in which:

Essentially, in the practice of my invention I place a drum of suitable size upon the condenser shaft or other operating shaft of the device. I then provide a belt adapted to contact the surface of the drum and be moved thereby, which belt at at least one point I lead away from the surface of the drum to the position in which I desire to place my indicator. The belt will be provided with suitable graduations to indicate the setting of the shaft, and as it is led away from the drum I prefer to twist it into a position of desired angularity to the vision of the operator. The twisting may be accomplished by a bracket, which at the same time may serve to provide a pointer for my indicator and/or an opening through which the indicator may be viewed, or through which the light may reach the indicator when it is of the type susceptible to indirect lighting. Where indirect lighting is employed, the belt, of course, will be translucent; otherwise it need not be. In one embodiment of my invention I provide two drums upon interspaced shafts, and I run an endless belt about these drums, twisting it at the position where I desire to locate an indicator window. In another embodiment I employ the belt, in part at least, as a means for controlling the rotation of the shaft, as will hereinafter be explained.

Figure 1:
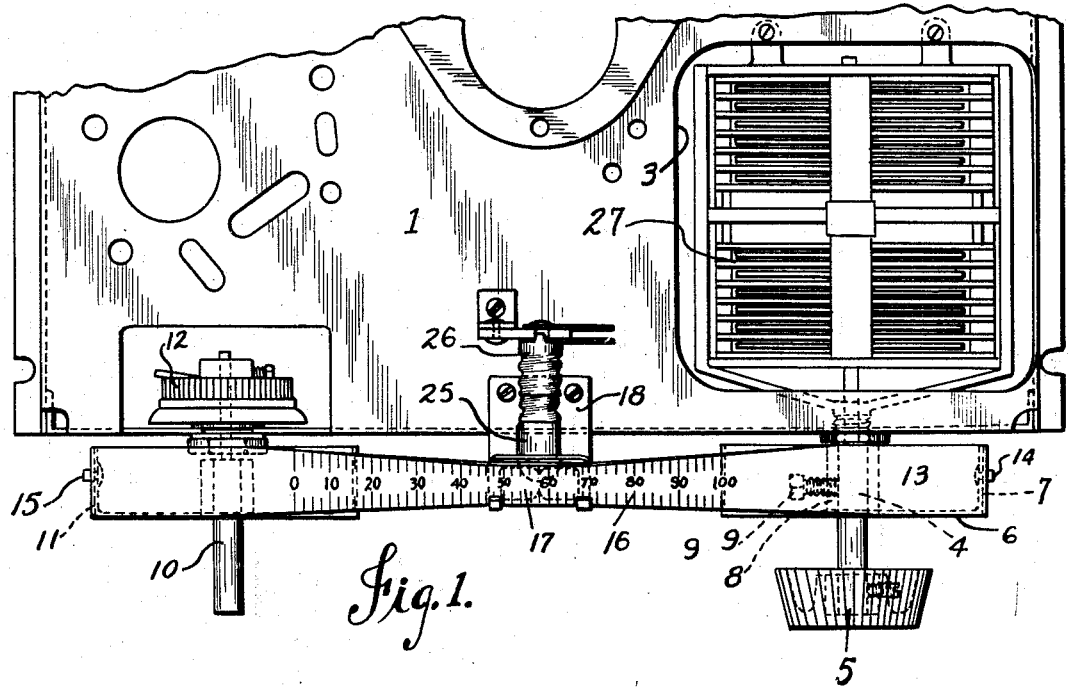
Figure 1 is a plan view of one form of my indicating device.
Figure 2:
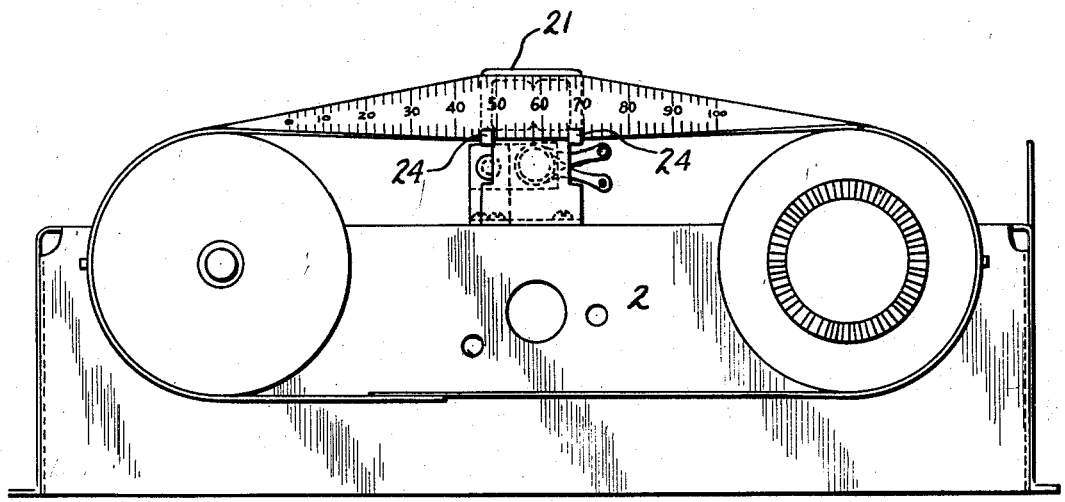
Fig. 2 is an elevation thereof.

In Figs. 1 and 2, I have shown at 1 a representation of the top of the chassis pan of a radio set, which pan will have a front portion, indicated at 2. An opening 3 is provided for a gang condenser having the usual shaft 4. This shaft may extend through the front panel of the cabinet (not shown) and may be fitted with a knob 5 for manual rotation. I provide a drum 6, and I fix it non-rotatably to my shaft 4. The drum has an outer cylindrical flange 7, and an inner sleeve 8 surrounding the shaft and fitted with a set screw 9. At the opposite side of the chassis, I have located a second shaft 10 parallel to the shaft 4. A second drum 11 is placed upon this shaft, but need not be fixed thereon. In the particular embodiment shown, the shaft 10 is the operating shaft of a volume controlling rheostat 12, and the drum 11 is rotatably mounted upon the shaft 10 so that the shaft may be independently rotated. A knob for manual operation may be affixed to the shaft 10, forming another of the controls of my set. An endless band or belt 13 is passed around the drums 6 and 11; and in order that it may move positively with these drums, projecting pins 14 and 15 may engage in corresponding holes in the belt. Since in the particular embodiment shown the condenser shaft 4 is rotated only through 180 degrees of arc, the pins 14 and 15 will always be in engagement with the holes in the band. Should it be desired, however, to provide for greater than 180 degrees of rotation, a series of the pins 14 and 15 may be placed on the drums and caused to engage in a plurality of holes in the belt. An advantage of my construction resides in this: that it may be used as an indicator with entire satisfaction under conditions where the control shaft must rotate more than 360 degrees, as will be clear.

The belt 13 will bear upon its face printed graduations or indicia 16, and in one stretch of its travel it will be tilted to the desired angle for viewing, by a bracket as is shown at 17 in Fig. 1.

Figure 3:
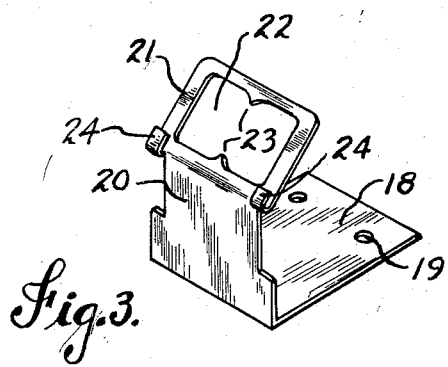
Fig. 3 is a perspective view of a bracket which I may employ for indirect lighting.

A desirable form of bracket is illustrated in Fig. 3, and comprises a base 18, having holes 19 for screws or rivets to be used in attaching it to the chassis, an upright or standard portion 20, and a tilted portion 21 at a desired angle to the portion 20. This tilted portion, where my device is to be used with indirect lighting, will have a central cut out portion or light window 22, and will preferably be provided with a pair of indicating points 23. The angularity of the portion 21 will be such as to tilt the belt to the desired degree to the vertical, and in order that the lowermost side of the belt may be held thereon, I provide the portion 21 with turned-over ears 24, in back of which the edge of the belt may engage, as shown in Figs. 1 and 2. In use, where I employ indirect lighting, I provide a bulb 25, the illuminated portion of which may be located beneath the window in the member 21. This bulb will be screwed into a socket 26, which is shown as mounted upon the chassis 1, but may with equal facility be mounted in the same or in another position upon the bracket member illustrated in Fig. 3.

A control of the rheostat 12 by means of the shaft 10 will have no effect on my indicating device, since the drum 11 is rotatably mounted upon the said shaft. A turning of the knob 5, however, and consequently a variation in the setting of the condensers 27, attached to shaft 4, will cause the drum 6 to rotate and carry with it, in either direction, the belt 13. The belt will thus be caused to move past the window in the member 21, and an indication of the setting of the apparatus thereby obtained. It will be understood that the radio cabinet will be provided with a sight opening through which that portion of the belt which is tilted to the proper angle by the bracket of Fig. 3, may be viewed by the operator. For direct lighting I need not employ a translucent belt, and I locate my bulb 25 above the bracket and the belt, so that the light thereof strikes the belt downwardly. The sight opening in the cabinet will preferably not be large enough in this instance to permit the bulb to be seen directly.

Figure 4:
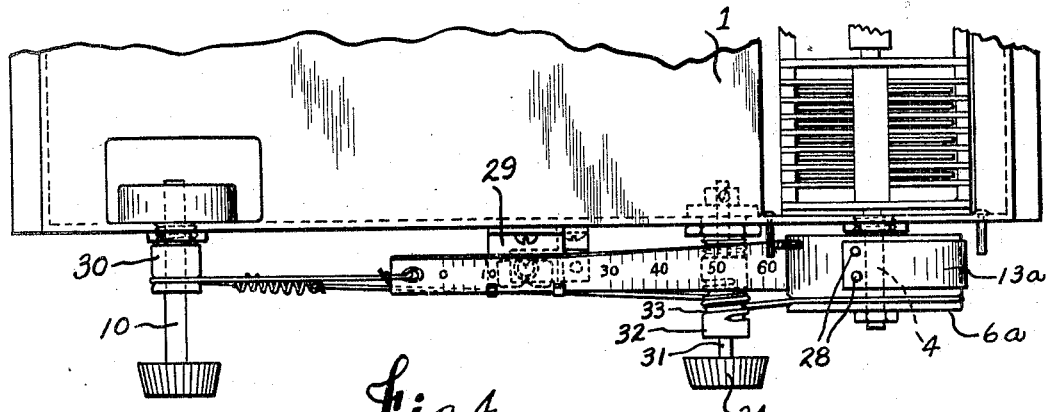
Fig. 4 is a plan view of another type of device embodying my invention.
Figure 5:
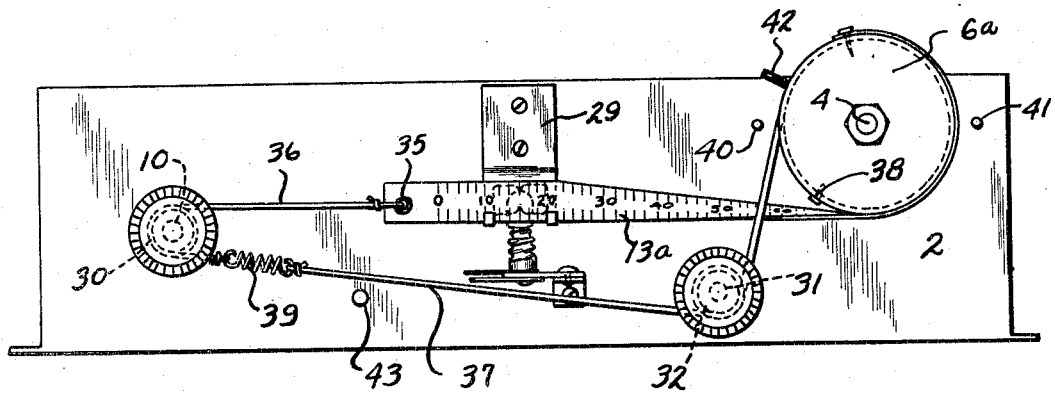
Fig. 5 is an elevation thereof.

In the form of device shown in Figs. 4 and 5, my belt becomes a part of the operating means for the controlled shaft. This shaft is again the shaft 4, and it has a drum 6a non-rotatably attached to it. The belt 13a is in this instance not continuous. One end of it is attached as by rivets 28, to the drum 6a, and the other end is led off therefrom and tilted to the desired angularity by a bracket indicated generally at 29. Upon the shaft 10 there may be rotatably mounted a sheave 30, and a supplementary or operating shaft 31 may be journaled upon my chassis. This shaft will have non-rotatably affixed to it a sheave 32, which may bear a peripheral helical thread or groove indicated at 33. The portion of the shaft 31 which projects through the front panel of the cabinet may have a knob 34 thereon. The end of the belt which is furthest from the controlled shaft 4 may be fitted with an eyelet 35, and a cable 36, 37 may be attached to said belt, may pass over said sheave 30, be wound about the sheave 32, and pass back, in the opposite direction to the belt, around the drum 6a to a point of attachment shown at 38. In order to maintain the cable and belt at the proper degree of tension, a spring 39 may be placed in the cable between the portions 36 and 37. It will now be seen that a rotation of the sheave 32 in a clockwise direction will result in a counter-clockwise rotation of the drum 6a, through the direct action of that portion of the cable 37 which extends between the sheave 32 and the drum, the drum being prevented from rotating too far in the said direction by the controlling action of the belt 13a and the spring tension member 39. When the sheave 32 is rotated in a counter-clockwise direction, the drum 6a will be rotated in a clockwise direction, through a direct pull exerted thereon by the belt 13a, the motion being controlled by the tension of the cable portion 37. Thus the belt forms an integral part of the motion transmitting mechanism whereby the position of the shaft 4 is controlled in my device. I may, of course, provide suitable stops 40 and 41 on the chassis of my device, and a co-operating stop 42 on the drum 6a to limit the motion thereof to the particular cycle desired.

The belt 13a, as it passes through the portion of the bracket 29, may be subjected either to direct or indirect lighting, as hereinabove set forth, and there will be provided in the radio cabinet a suitable sight opening through which the belt may be viewed.

An obvious advantage of the type of construction which I have just described, is that I have combined in an inexpensive but highly advantageous indicating device, vernier means for the actuation of the condenser gang shaft. Another advantage is its flexibility, in that the several operating knobs or devices may be located substantially where desired. The belt in the embodiment of Fig. 5 may be led away either from the bottom or from the top of the drum 6, and it is possible to adapt the indicating devices of Figs. 4 and 5 to the chassis of Figs. 1 and 2. The shaft 10 in Fig. 5 need not be the operating shaft of a rheostat, or the like, but may be an idler shaft upon which the sheave 30 is mounted, and the rheostat may be so mounted that its shaft 43 is symmetrically arranged with reference to the shaft 31. In either event, I have succeeded in producing an indicator which occupies but little space, and the visual part of which may be located, if desired, exactly in the center of the cabinet without making it necessary to locate the gang condenser or other large parts at said point.

Modifications may, of course, be made in my invention without departing from the spirit thereof.

Having thus described my invention, what I claim as new and desire to secure by Letters Patent, is:

1. In an indicator, a shaft, a drum operatively connected to said shaft, an interspaced drum mounted for rotation, and an endless belt indicator passing over said drums, and arranged to be moved by said first mentioned drum, and means intermediate said drums to twist a portion of said belt into a new plane, said means comprising a bracket having portions engaging said belt, and a window in said bracket through which light may reach said band.

2. In a radio receiving set, in combination, a shaft, non-parallel with the front of the cabinet of said set, a flexible belt operatively connected with said shaft so as to be moved thereby, and arranged to be extended along and behind the said front of said cabinet, a viewing opening in said cabinet through which said belt may be seen, and means behind said viewing opening to tilt said belt to an angle to the horizontal.

3. In a radio set, a shaft, a drum on said shaft, a flexible band operatively connected with said drum so as to be moved thereby, means for leading said band away from said drum, means for twisting said band, and means for effecting the rotation of said shaft, said means comprising an operating member having an operating connection to said drum and to said band, said connection comprising a resilient element.

4. In a radio set, a shaft, a drum mounted non-rotatably on said shaft, a flexible band bearing indicia, and having one end attached to said drum, an idler sheave, an operative element comprising a driving sheave, and a cable connected to the free end of said band, and passing over both of said sheaves and returning to said drum, whereby upon rotation of said operating part, said drum may be rotated.

5. In a radio set, a shaft, a drum mounted non-rotatably on said shaft, a flexible band bearing indicia, and having one end attached to said drum, an idler sheave, an operative element comprising a driving sheave, and a cable connected to the free end of said band, and passing over both of said sheaves and returning to said drum, whereby upon rotation of said operating part, said drum may be rotated, said cable comprising a resilient member.

6. In a radio set, a shaft, a drum mounted non-rotatably on said shaft, a flexible band bearing indicia, and having one end attached to said drum, an idler sheave, an operative element comprising a driving sheave, and a cable connected to the free end of said band, and passing over both of said sheaves and returning to said drum, whereby upon rotation of said operating part, said drum may be rotated, said sheave on said operative part being smaller than said drum, whereby a vernier action is obtained, and a bracket for said band arranged to twist said band to a position of desired angularity to the horizontal.

7. In a radio set, a shaft, a drum mounted non-rotatably on said shaft, a flexible band bearing indicia, and having one end attached to said drum, an idler sheave, an operative element comprising a driving sheave, and a cable connected to the free end of said band, and passing over both of said sheaves and returning to said drum, whereby upon rotation of said operating part, said drum may be rotated, said sheave on said operative part being smaller than said drum, whereby a vernier action is obtained, and a bracket for said band arranged to twist said band to a position of desired angularity to the horizontal, said bracket having a portion lying beneath said band, said portion being provided with a window, and illuminating means located behind said window.

8. In an indicating device for radio apparatus, a rotary element rotating in accordance with an adjustment of the apparatus, a belt moved by the rotation of said element, means supporting a stretch of said belt extending from said element, said stretch bearing indicia visible at one side thereof, a part of said side being exposed to view, and means twisting said belt and tilting said exposed part into a plane different from that in which said stretch extends from said rotary element, to facilitate the view of said side for observing the degree of adjustment of said apparatus.

9. In an indicating device for radio apparatus, a rotary element rotating on a substantially horizontal axis in accordance with an adjustment of the apparatus, a belt moved by the rotation of said element, means supporting a stretch of said belt extending from said element with its width substantially horizontal, said stretch bearing indicia visible at one side thereof, a part of said side being exposed to view, and means twisting said belt and tilting said side upward, to facilitate the view of said side for observing the degree of adjustment of said apparatus.

RALPH H. LANGLEY.